United States Patent
Croak et al.

(10) Patent No.: US 8,018,835 B1
(45) Date of Patent: Sep. 13, 2011

(54) METHOD AND APPARATUS FOR ANALYZING SERVICE DISRUPTIONS IN A COMMUNICATION NETWORK

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1398 days.

(21) Appl. No.: 11/323,023

(22) Filed: Dec. 30, 2005

(51) Int. Cl.
*H04L 12/26* (2006.01)
*G06F 15/173* (2006.01)

(52) U.S. Cl. .......................... 370/216; 709/224

(58) Field of Classification Search .................. None
See application file for complete search history.

(56) References Cited

U.S. PATENT DOCUMENTS

| | | | |
|---|---|---|---|
| 6,597,777 B1 * | 7/2003 | Ho .................................. | 379/133 |
| 2003/0187967 A1 * | 10/2003 | Walsh et al. ..................... | 709/223 |
| 2004/0179470 A1 * | 9/2004 | Nguyen et al. ................. | 370/216 |
| 2006/0092828 A1 * | 5/2006 | Aoki et al. ....................... | 370/216 |
| 2006/0285487 A1 * | 12/2006 | Yasuie et al. ................... | 370/216 |
| 2006/0291580 A1 * | 12/2006 | Horvitz .......................... | 375/265 |
| 2007/0067675 A1 * | 3/2007 | Wigley et al. .................... | 714/20 |
| 2007/0143764 A1 * | 6/2007 | Kern et al. ..................... | 718/104 |
| 2009/0210535 A1 * | 8/2009 | Whitman, Jr. ................. | 709/226 |

* cited by examiner

*Primary Examiner* — Ricky Ngo
*Assistant Examiner* — Clemence Han

(57) ABSTRACT

Method and apparatus for analyzing service disruptions in a communication network is described. In one example, data indicative of the service disruptions are obtained across a period of time. External condition data related to the service disruptions are obtained. Historical trend data are established by correlating the data with the external condition data to identify at least one statistical trend. In one example, external conditions may be monitored and alarms may be generated for instances where the external conditions exhibit the historical trend data.

6 Claims, 5 Drawing Sheets

200

300

400

METHOD AND APPARATUS FOR ANALYZING SERVICE DISRUPTIONS IN A COMMUNICATION NETWORK

BACKGROUND OF THE INVENTION

1. Field of the Invention

Embodiments of the present invention generally relate to telecommunications systems and, more particularly, to a method and apparatus for analyzing service disruptions in a communication network.

2. Description of the Related Art

Generally, telecommunications systems provide the ability for two or more people or machines (e.g., computerized or other electronic devices) to communicate with each other. A telecommunications system may include various networks for facilitating communication that may be generally organized into packet networks and circuit-switched networks. An exemplary circuit-switched network includes a plain old telephone system (POTS), such as the publicly switched telephone network (PSTN). Exemplary packet networks include internet protocol (IP) networks, asynchronous transfer mode (ATM) networks, frame-relay networks, and the like. One type of packet network is a voice-over-internet protocol (VoIP) network.

In a communication network, network elements and/or facilities may fail or otherwise cease to operate as intended from time to time. Such failures cause service disruptions in that service provided to customers may be severely affected. Accordingly, there exists a need in the art for a method and apparatus for analyzing and predicting service disruptions in a communication network.

SUMMARY OF THE INVENTION

Method and apparatus for analyzing service disruptions in a communication network is described. In one embodiment, data indicative of the service disruptions are obtained across a period of time. External condition data related to the service disruptions are obtained. Historical trend data are established by correlating the data with the external condition data to identify at least one statistical trend. In one embodiment, external conditions may be monitored and alarms may be generated for instances where the external conditions exhibit the historical trend data.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
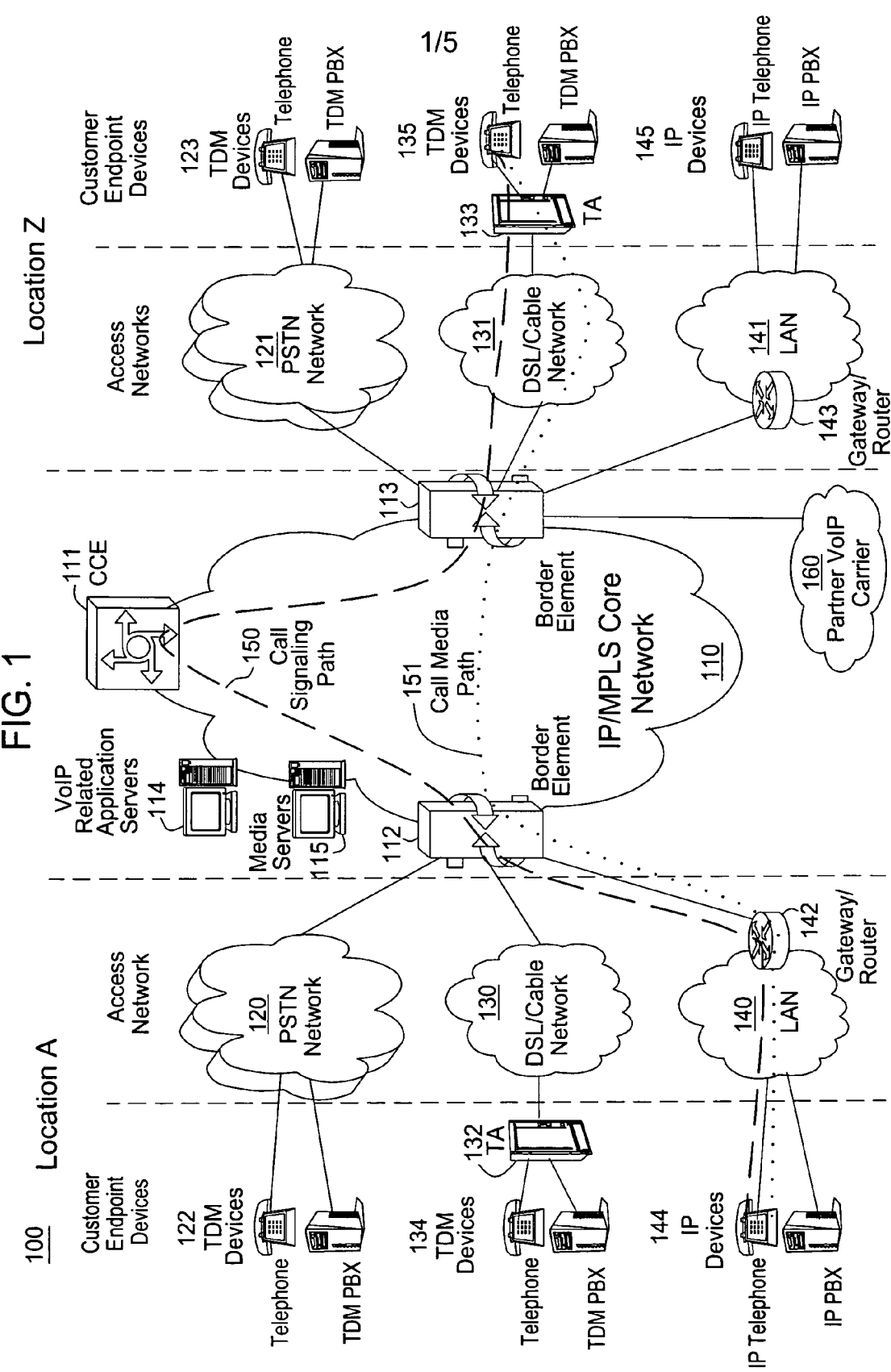
FIG. 1 is a block diagram depicting an exemplary embodiment of a communication system in accordance with the invention.

To better understand the present invention, FIG. 1 illustrates communication architecture 100 comprising an example network, e.g., a packet network such as a Voice over Internet Protocol (VoIP) network, related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

Referring to FIG. 1, the customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Servers (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that require certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related application server 114 to obtain the information to complete this call. In one embodiment, the Application Server (AS) functions as a back-to-back user agent. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP 200 OK response message if SIP is used, is sent in the reverse direction back to the CCE 111. After the CCE 111 receives the call acknowledgement message, it will then send a call acknowledgement signaling message, such as a SIP 200 OK response message if SIP is used, toward the calling party. In addition, the CCE 111 also provides the necessary information of the call to both BE 112 and BE 113 so that the call data exchange can proceed directly between BE 112 and BE 113. The call signaling path 150 and the call media path 151 are illustratively shown in FIG. 1. Note that the call signaling path and the call media path are different because once a call has been setup up between two endpoints, the CCE 111 does not need to be in the data path for actual direct data exchange.

Media Servers (MS) 115 are special servers that typically handle and terminate media streams, and to provide services such as announcements, bridges, transcoding, and Interactive Voice Response (IVR) messages for VoIP service applications.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Figure 2:
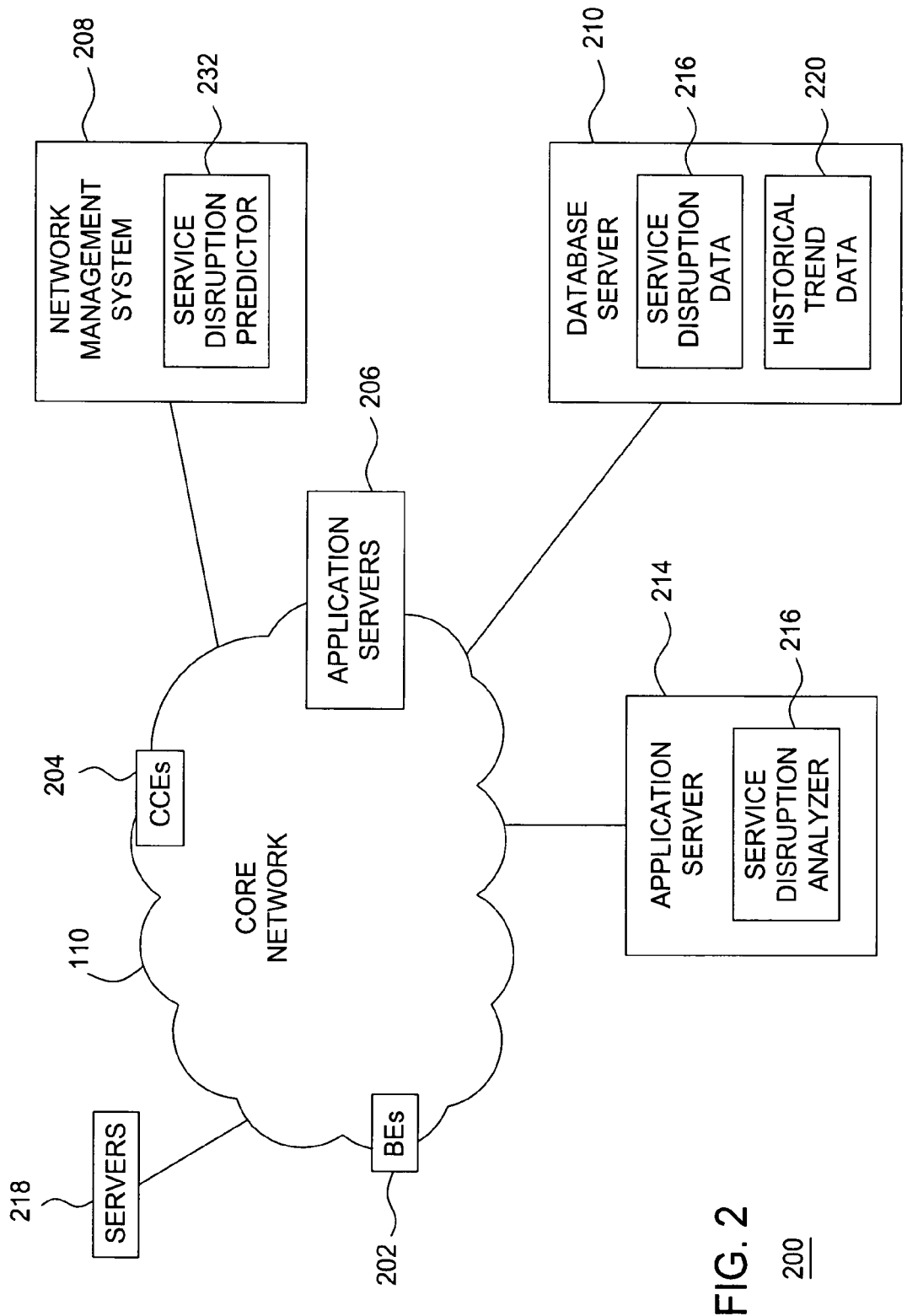
FIG. 2 is a block diagram depicting an exemplary embodiment of a portion of the communication system of FIG. 1 in accordance with one or more aspects of the invention.

FIG. 2 is a block diagram depicting an exemplary embodiment of a portion 200 of the communication system 100 in accordance with one or more aspects of the invention. In the portion 200, the core network 110 includes BEs 202, CCEs 204, and application servers 206. Each of the BEs 202, the CCEs 204, and the application servers 206. A network management system 208 coupled to the core network 110 is configured to monitor the BEs 202, the CCEs 204, and the application servers 206 and detect failures of such network elements. The network management system 208 generates alarms in response to such network element failures.

In some cases, the network management system 208 or a network operator using the network management system 208 is able to correct network element failures when they occur. In other cases, the network management system 208 or a network operator using the network management system 208 is not able to correct network element failures when they occur, leading to service disruptions. That is, some customers may lose their service or their service may become degraded for a given period of time. Service disruptions may occur due to unavailability of network operators to respond to an alarm. The network management system 208 is configured to store data indicative of service disruptions in a database server 210 coupled to the core network 110 as service disruption data 212. Such data may include the time and date of the service disruption, the duration of the service disruption, the cause of the service disruption (e.g., identities of particular failing network elements or facilities), and the like. The database server 208 may implement any type of database platform known in the art, such as a database platform commercially available from Oracle Corporation.

An application server 214 coupled to the core network 110 is configured to implement a service disruption analyzer 216. The service disruption analyzer 216 is configured to obtain service disruption data across a particular period of time from the database server 210. The service disruption analyzer 216 is also configured to obtain external condition data related to the service disruptions from one or more servers ("servers 218") and/or from the database server 208. The external condition data include statistics or conditions that are externally related to service disruptions. For example, the external condition data may include information such as time data associated with each of the service disruptions, staffing profile data associated with each of the service disruptions, and seasonal holiday data associated with each of the service disruptions.

The time data may include time of day and day of week for each of the service disruptions. The time data may be stored by the database server 208 along with the service disruption data 212. The staffing profile data may include a percentage or number of absences of staff of the entity operating the core network 110. By "staff" it is meant any employee, independent contractor, or the like used by the operating entity to manage the core network 110, functions related to the core network 110, or functions related to services provided by the core network 110. The staffing profile data may be obtained from a server employing a human resources function, for example. The seasonal holiday data may include an indication of whether or not the particular service disruption occurred on a predefined holiday (e.g., recognized federal holidays and/or other designated holidays).

The service disruption analyzer 216 establishes historical trend data by correlating the service disruption data with the external condition data to identify at least one statistical trend. For example, the service disruption analyzer 216 may identify a trend correlating the service disruptions over a period of time to the time data (e.g., times of day and days of the week). The service disruption analyzer 216 may identify a trend correlating the service disruptions over a period of time to the staffing profile data. For example, percentages or numbers of staff absences may be determined for each of the service disruptions. The service disruption analyzer 216 may identify a trend correlating the service disruptions over a period of time to the seasonal holiday data. For example, the number of service disruptions on or around a holiday may be identified. The historical trend data generated by the service disruption analyzer 216 may be stored by the database server 208 as historical trend data 220. The service disruption analyzer 216 may periodically update the historical trend data 220 in response to new information regarding service disruptions and corresponding external condition data.

The network management system 208 may implement a service disruption predictor 218. The service disruption predictor 220 is configured to obtain the historical trend data 220 from the database server 210. The service disruption predictor 220 is also configured to obtain various external condition data. The service disruption predictor 220 may obtain the external condition data in real-time or in substantially real-time. For example, the service disruption predictor 220 is configured to track the time of day and day of week. The service disruption predictor 220 may be configured to track a predefined set of seasonal holidays. The service disruption predictor 220 may obtain current and future staffing profile information from the servers 218. Such staffing profile information may include, for example, planned vacations, current absences, and the like. The service disruptions predictor 220 generates alarms in response to instances where the external conditions exhibit the historical trend data. For example, the current percentage/number or further percentage/number of staff absences may indicate a potential service disruption (e.g., there may be insufficient staff to respond to alarms).

Although the present invention has been described with respect to the application server 214, the network management system 208, and the database 210, those skilled in the art will appreciate that other configurations may be employed. In general, a service disruption analyzer is employed within a server to process service disruption data, and a service disruption predictor is employed within the same or different server to monitor external conditions.

Figure 3:
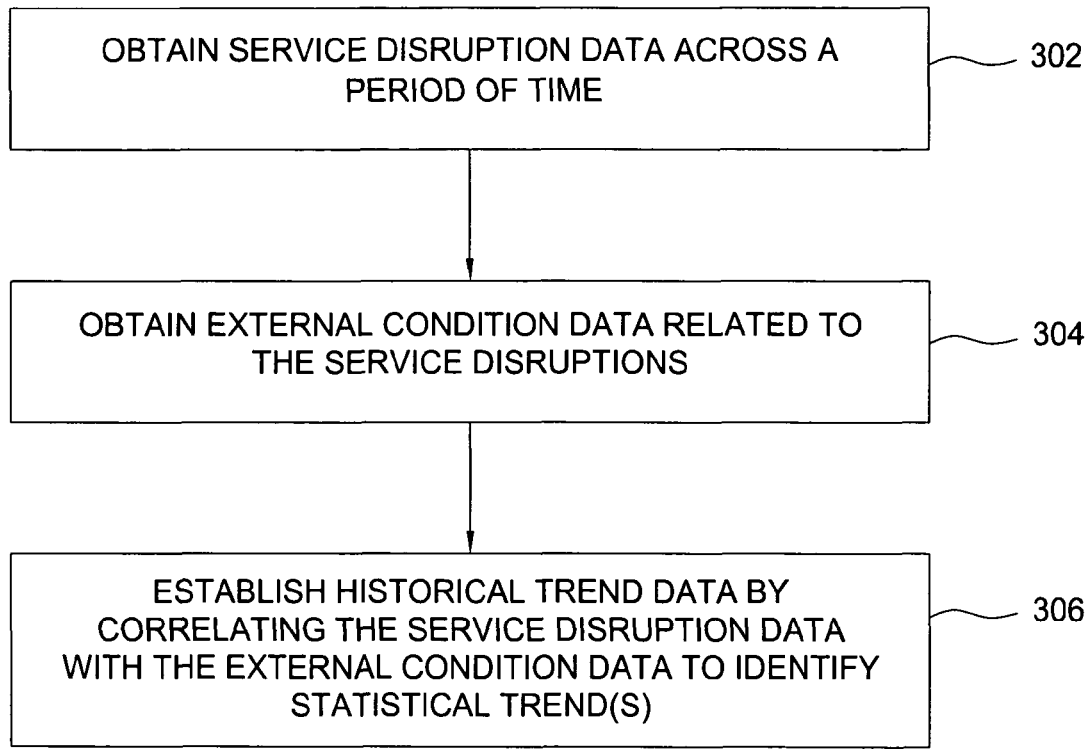
FIG. 3 is a flow diagram depicting an exemplary embodiment of a method for analyzing service disruptions in accordance with one or more aspects of the invention.

FIG. 3 is a flow diagram depicting an exemplary embodiment of a method 300 for analyzing service disruptions in accordance with one or more aspects of the invention. The method 300 may be performed by the service disruption analyzer 216. The method 300 begins at step 302, where service disruption data is obtained across a period of time. At step 304, external condition data related to the service disruptions is obtained. At step 306, historical trend data is established by correlating the service disruption data with the external condition data to identify one or more statistical trends. The method 300 may be periodically repeated to update the historical trend data over time.

Figure 4:
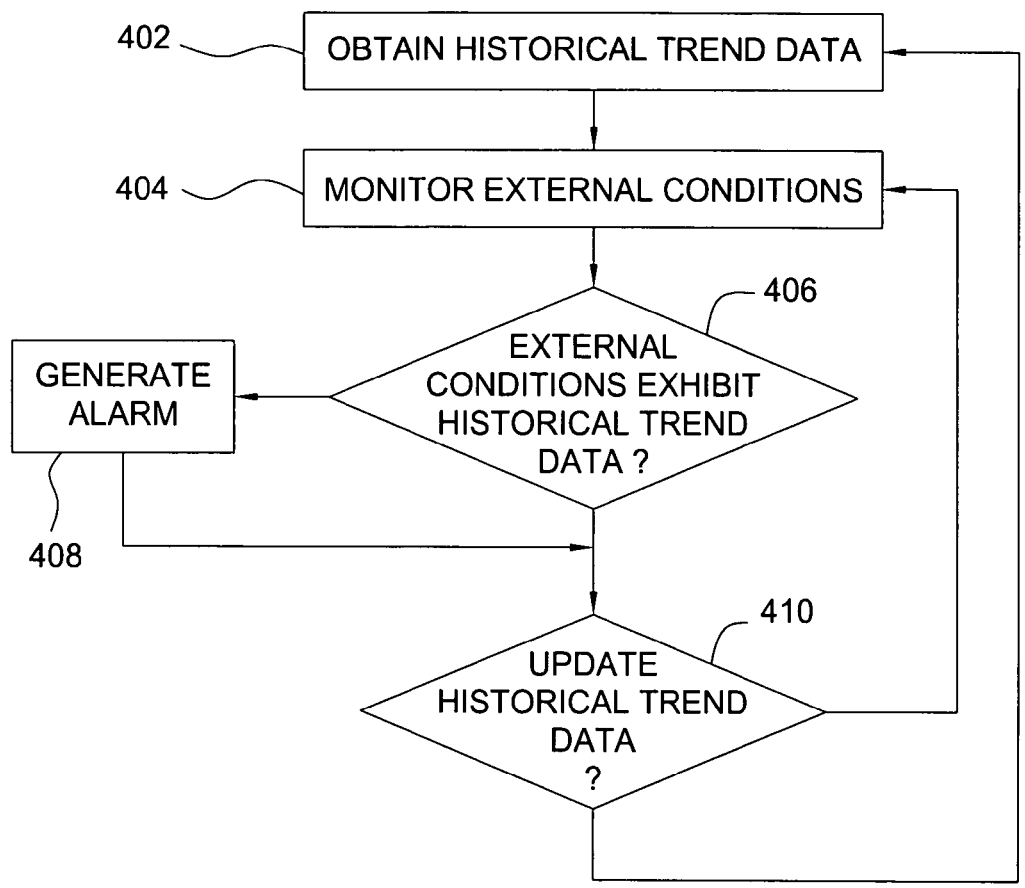
FIG. 4 is a flow diagram depicting an exemplary embodiment of a method for monitoring external conditions in accordance with one or more aspects of the invention.

FIG. 4 is a flow diagram depicting an exemplary embodiment of a method 400 for monitoring external conditions in accordance with one or more aspects of the invention. The method 400 may be performed by the service disruption predictor 222. The method 400 begins at step 402, where historical trend data is obtained. At step 404, external conditions are monitored in the communication network. At step 406, a determination is made whether the external conditions exhibit the historical trend data. If so, the method 400 proceeds to step 408, where an alarm is generated. The method 400 proceeds from step 408 to step 410. If the external conditions do not exhibit the historical trend data at step 406, then the method 400 proceeds to step 410. At step 410, a determination is made whether updated historical trend data should be obtained. If so, the method 400 returns to step 402. Otherwise, the method 400 returns to step 404 to continue monitoring external conditions.

Figure 5:
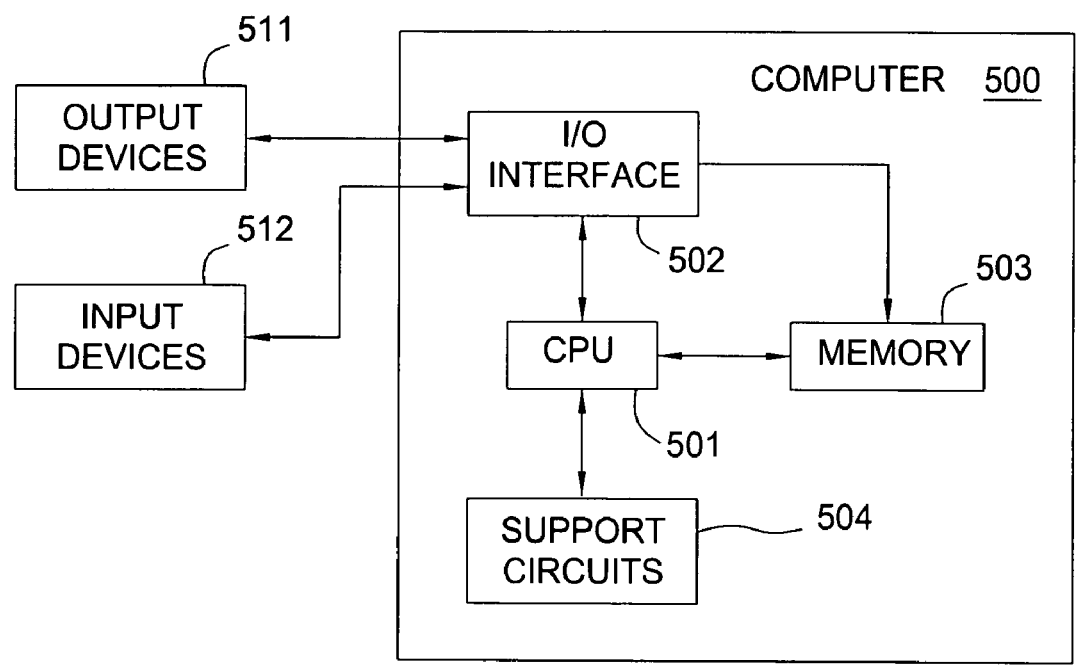
FIG. 5 is a block diagram depicting an exemplary embodiment of a computer suitable for implementing the processes and methods described herein.

FIG. 5 is a block diagram depicting an exemplary embodiment of a computer 500 suitable for implementing the processes and methods described herein. The computer 500 may be used to implement the service disruption analyzer 216 and the service disruption predictor 222. The computer 500 includes a central processing unit (CPU) 501, a memory 503, various support circuits 504, and an I/O interface 502. The CPU 501 may be any type of microprocessor known in the art. The support circuits 504 for the CPU 501 include conventional cache, power supplies, clock circuits, data registers, I/O interfaces, and the like. The I/O interface 502 may be directly coupled to the memory 503 or coupled through the CPU 501. The I/O interface 502 may be coupled to various input devices 512 and output devices 511, such as a conventional keyboard, mouse, printer, and the like.

The memory 503 may store all or portions of one or more programs and/or data to implement the processes and methods described herein. Notably, the memory 503 may store program code to be executed by the CPU 501 for performing the method 300 and the method 400. Although one or more aspects of the invention are disclosed as being implemented as a computer executing a software program, those skilled in the art will appreciate that the invention may be implemented in hardware, software, or a combination of hardware and software. Such implementations may include a number of processors independently executing various programs and dedicated hardware, such as ASICs.

The computer 500 may be programmed with an operating system, which may be OS/2, Java Virtual Machine, Linux, Solaris, Unix, Windows, Windows95, Windows98, Windows NT, and Windows2000, WindowsME, and WindowsXP, among other known platforms. At least a portion of an operating system may be disposed in the memory 503. The memory 503 may include one or more of the following random access memory, read only memory, magneto-resistive read/write memory, optical read/write memory, cache memory, magnetic read/write memory, and the like, as well as signal-bearing media as described below.

An aspect of the invention is implemented as a program product for use with a computer system. Program(s) of the program product defines functions of embodiments and can be contained on a variety of signal-bearing media, which include, but are not limited to: (i) information permanently stored on non-writable storage media (e.g., read-only memory devices within a computer such as CD-ROM or DVD-ROM disks readable by a CD-ROM drive or a DVD drive); (ii) alterable information stored on writable storage media (e.g., floppy disks within a diskette drive or hard-disk drive or read/writable CD or read/writable DVD); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct functions of the invention, represent embodiments of the invention.

While the foregoing is directed to embodiments of the present invention, other and further embodiments of the invention may be devised without departing from the basic scope thereof, and the scope thereof is determined by the claims that follow.

The invention claimed is:

1. A method of analyzing service disruptions in a communication network, comprising:
    obtaining data indicative of the service disruptions across a period of time;
    obtaining external condition data related to the service disruptions; and
    establishing, via a processor, historical trend data by correlating the data with the external condition data to identify a statistical trend, wherein the external condition data comprises staffing profile data associated with each of the service disruptions, wherein the staff profile data comprises information about employees used by an operating entity of the communication network and wherein the statistical trend includes a trend correlating the service disruptions and the staffing profile data, wherein the staffing profile data for each of the service disruptions includes a number of staff absences.

2. A method of analyzing service disruptions in a communication network, comprising:
    obtaining data indicative of the service disruptions across a period of time;
    obtaining external condition data related to the service disruptions; and
    establishing, via a processor, historical trend data by correlating the data with the external condition data to identify a statistical trend, wherein the external condition data comprises seasonal holiday data associated with each of the service disruptions, and wherein the statistical trend includes a trend correlating if a particular service disruption of the service disruptions occurred on a seasonal holiday.

3. Apparatus for analyzing service disruptions in a communication network, comprising:
    means for obtaining data indicative of the service disruptions across a period of time;
    means for obtaining external condition data related to the service disruptions; and
    means for establishing historical trend data by correlating the data with the external condition data to identify a statistical trend, wherein the external condition data comprises staffing profile data associated with each of the service disruptions, wherein the staff profile data comprises information about employees used by an operating entity of the communication network and wherein the statistical trend includes a trend correlating the service disruptions and the staffing profile data, wherein the staffing profile data for each of the service disruptions includes a number of staff absences.

4. Apparatus for analyzing service disruptions in a communication network, comprising:
    means for obtaining data indicative of the service disruptions across a period of time;
    means for obtaining external condition data related to the service disruptions; and
    means for establishing historical trend data by correlating the data with the external condition data to identify a statistical trend, wherein the external condition data comprises seasonal holiday data associated with each of the service disruptions, and wherein the statistical trend includes a trend correlating if a particular service disruption of the service disruptions occurred on a seasonal holiday.

5. A computer readable non-transitory storage medium having stored thereon instructions that, when executed by a processor, cause the processor to perform a method of analyzing service disruptions in a communication network, comprising:
    obtaining data indicative of the service disruptions across a period of time;
    obtaining external condition data related to the service disruptions; and
    establishing historical trend data by correlating the data with the external condition data to identify a statistical trend, wherein the external condition data comprises staffing profile data associated with each of the service disruptions, wherein the staff profile data comprises information about employees used by an operating entity of the communication network and wherein the statistical trend includes a trend correlating the service disruptions and the staffing profile data, wherein the staffing profile data for each of the service disruptions includes a number of staff absences.

6. A computer readable non-transitory storage medium having stored thereon instructions that, when executed by a processor, cause the processor to perform a method of analyzing service disruptions in a communication network, comprising:
    obtaining data indicative of the service disruptions across a period of time;
    obtaining external condition data related to the service disruptions; and
    establishing historical trend data by correlating the data with the external condition data to identify a statistical trend, wherein the external condition data comprises seasonal holiday data associated with each of the service disruptions, and wherein the statistical trend includes a trend correlating if a particular service disruption of the service disruptions occurred on a seasonal holiday.

* * * * *